US009456612B2

(12) United States Patent
Israni et al.

(10) Patent No.: US 9,456,612 B2
(45) Date of Patent: Oct. 4, 2016

(54) DRY FLOUR DISPENSING APPARATUS AND USING THE SAME FOR A FOOD PREPARATION APPLIANCE

(71) Applicants: Pranoti Nagarkar Israni, Singapore (SG); Rishi Israni, Singapore (SG); Akhmad Fauzan, Singapore (SG)

(72) Inventors: Pranoti Nagarkar Israni, Singapore (SG); Rishi Israni, Singapore (SG); Akhmad Fauzan, Singapore (SG)

(73) Assignee: Zimplistic Pte. Ltd., Singapore (SG)

( * ) Notice: Subject to any disclaimer, the term of this patent is extended or adjusted under 35 U.S.C. 154(b) by 0 days.

(21) Appl. No.: 14/582,166

(22) Filed: Dec. 23, 2014

(65) Prior Publication Data

US 2015/0181894 A1     Jul. 2, 2015

Related U.S. Application Data

(63) Continuation-in-part of application No. 14/445,122, filed on Jul. 29, 2014.

(51) Int. Cl.
| | |
|---|---|
| A21C 1/14 | (2006.01) |
| B01F 15/04 | (2006.01) |
| G01F 11/10 | (2006.01) |
| A21D 8/00 | (2006.01) |
| A21C 11/00 | (2006.01) |
| B65D 83/06 | (2006.01) |

(52) U.S. Cl.
CPC ........... *A21C 1/1425* (2013.01); *A21C 1/1455* (2013.01); *A21C 11/006* (2013.01); *A21D 8/00* (2013.01); *B01F 15/0454* (2013.01); *B65D 83/06* (2013.01); *G01F 11/10* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 1,940,751 | A | * | 12/1933 | Hermani | 222/248 |
| 2,723,780 | A | * | 11/1955 | Clement | 141/362 |
| 3,794,215 | A | * | 2/1974 | Osterhaus | 222/1 |
| 4,162,751 | A | * | 7/1979 | Hetland et al. | 222/293 |
| 4,503,995 | A | * | 3/1985 | Anderson | A21C 5/04 222/219 |
| 4,560,092 | A | * | 12/1985 | Souza | 222/168 |
| 4,580,903 | A | * | 4/1986 | Ihler | A21C 5/02 366/76.9 |
| 4,674,660 | A | * | 6/1987 | Botto | 222/181.3 |
| 4,708,265 | A | * | 11/1987 | Bopst et al. | 222/43 |
| 4,842,416 | A | * | 6/1989 | Kullen et al. | 366/314 |
| 4,892,233 | A | * | 1/1990 | Zelickson | 222/226 |
| 4,942,807 | A | * | 7/1990 | Wong | 99/348 |
| 5,172,605 | A | * | 12/1992 | Schwartz | F16H 35/10 74/421 A |
| 5,626,260 | A | * | 5/1997 | Waldner | 222/144 |
| 6,843,166 | B1 | * | 1/2005 | Li | 99/327 |
| 7,993,694 | B2 | * | 8/2011 | Goderiaux et al. | 426/438 |
| 8,820,221 | B2 | | 9/2014 | Israni | |
| 2006/0150821 | A1 | * | 7/2006 | Paul et al. | 99/279 |

(Continued)

*Primary Examiner* — Dana Ross
*Assistant Examiner* — Renee Larose
(74) *Attorney, Agent, or Firm* — Geeta Kadambi; Riddhi IP LLC

(57) ABSTRACT

The instant disclosure presents a technological advancement of the flour dispensing mechanism for a food preparation appliance. The flour dispensing mechanism comprises a dry flour container, a blade assembly and a compartment wheel. The blade assembly comprises at least one packer and a blade. The dry flour container contains a knocker. The compartment wheel comprises a plurality of compartments as cubes. The gear box and motor estimate the quantity of the flour being dispensed using a software. The software also enables to estimate the level of dry flour in the dry flour container.

16 Claims, 6 Drawing Sheets

(56) References Cited

U.S. PATENT DOCUMENTS

| | | | |
|---|---|---|---|
| 2010/0282781 A1* | 11/2010 | Kinzie | G01F 11/24 222/239 |
| 2011/0163127 A1* | 7/2011 | DiBella-Lenaway | 222/145.6 |
| 2011/0305810 A1* | 12/2011 | Owensby et al. | 426/523 |
| 2012/0231132 A1* | 9/2012 | Tournour et al. | 426/389 |
| 2013/0200101 A1* | 8/2013 | Dooley et al. | 222/129.4 |
| 2013/0248563 A1* | 9/2013 | Baker et al. | 222/218 |

* cited by examiner

DRY FLOUR DISPENSING APPARATUS AND USING THE SAME FOR A FOOD PREPARATION APPLIANCE

CROSS REFERENCE TO RELATED APPLICATIONS

This application claims priority to a Provisional Application 2013096169 filed on Dec. 26, 2013 in Singapore and now pending U.S. Utility application Ser. No. 14/445,122 filed on 29 Jul. 2014 which is hereby incorporated by reference in its entireties for all of its teachings.

FIELD OF THE INVENTION

This disclosure relates generally to a dry flour dispensing apparatus and using the same for a food preparation apparatus. More specifically automated mechanical dispensing of measured dry flour is done using software controlled technology for a food preparation appliance.

BACKGROUND

Industrial scale flour dispensing for large commercial establishments have been achieved in food industry. A dry flour dispensing for home appliances as part of an automated apparatus to make flat bread is nonexistent. Individual serving size home cooking appliances and processes are semi-automated and have disparate steps in making a dough product. Specifically the art of making flat bread has multiple steps and the making of the dough is not only essential but critical as well. This step for individual serving is difficult to optimize and automate. There exists a need to overcome this hurdle.

SUMMARY OF INVENTION

The present invention is a dry flour dispensing apparatus with several sub-assemblies to dispense dry flour in measured quantity to make one dough ball at a time. This apparatus is a part of a food appliance to make flat breads. In this disclosure a method of using the dry flour dispensing apparatus is also described. In one embodiment, the dry flour dispensing apparatus comprises of a dry flour container, a blade, a compartmental wheel, a packer, a knocker and a gear box attached to a motor. In another embodiment, the compartment wheel comprises a plurality of compartments. Each compartment has a fixed volume to receive a specific amount of flour.

In one embodiment, the dry flour container has an upper opening to fill the dry flour and has a lid to cover it. In another embodiment the dry flour container is made up of food grade material. In one embodiment, a knocker comprises a spring steel part and is attached to the bottom of the dry flour container. The bottom of the dry flour container, in one embodiment, also receives the compartmental wheel having several flour holders to fill with dry flour. Every compartmental wheel cubes has a specific capacity to hold flour, in one embodiment.

In one embodiment, a novel packer is introduced. The packer disburses a fixed amount of dry flour to each flour holder in the compartmental wheel. The packer is made up of steel spring. In another embodiment, a steel spring knocker is designed such that it empties compartmental cubes each time so that even delivery of the flour is carried out.

In one embodiment, a blade is housed in the dry flour container. A gear box with predetermined teeth number is attached to the blade on one end and a motor on the other end, in one embodiment. In another embodiment, the motor is regulated by a software residing in a hardware, such as a processor, and provides feedback to regulate the dispensing and monitoring the level of dry flour in the container.

In one embodiment, a method of dispensing dry flour is described. The method starts with filling a dry flour container with dry flour for a specific quantity to make a flat bread. A blade rotates through the dry flour to disturb the dry flour and move the dry flour to a dispenser. A specified quantity of the dry flour is dispensed and received from the dispenser using a packer into a compartmental wheel having a multiple flour holder; and dispersing the filled dry flour from each multiple flour holder to a kneading compartment is done using a knocker.

In another embodiment, monitoring the level of dry flour in the container using feedback from a current drawn by a motor and the current drawn by the motor is correlated with the level of dry flour in the container using software residing in the processor. In another embodiment, the dry flour is tapped by a knocker to empty from the multiple flour holders into the kneading container.

The gear box is used for rotating the blade, the compartmental wheel, the packer and the knocker which in turn is attached to a motor.

Other features and advantages will be apparent from the detailed description, taken in conjunction with the accompanying drawings, which illustrate, by way of example, the principles of the current apparatus and method.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from accompanying drawings and from the detailed description that follows.

DETAILED DESCRIPTION

The invention discloses a novel dry flour dispensing apparatus and a method of using the same. Several novel parts, assemblies and software controlled monitoring and feedback system are described to make a single dough ball at a time to make flat breads. This apparatus is part of a larger cooking appliance that is used for automatically making one flat bread one at a time. Although the present embodiments have been described with reference to specific example embodiments, it will be evident that various modifications and changes may be made to these embodiments without departing from the broader spirit and scope of the various embodiments.

Figure 1:
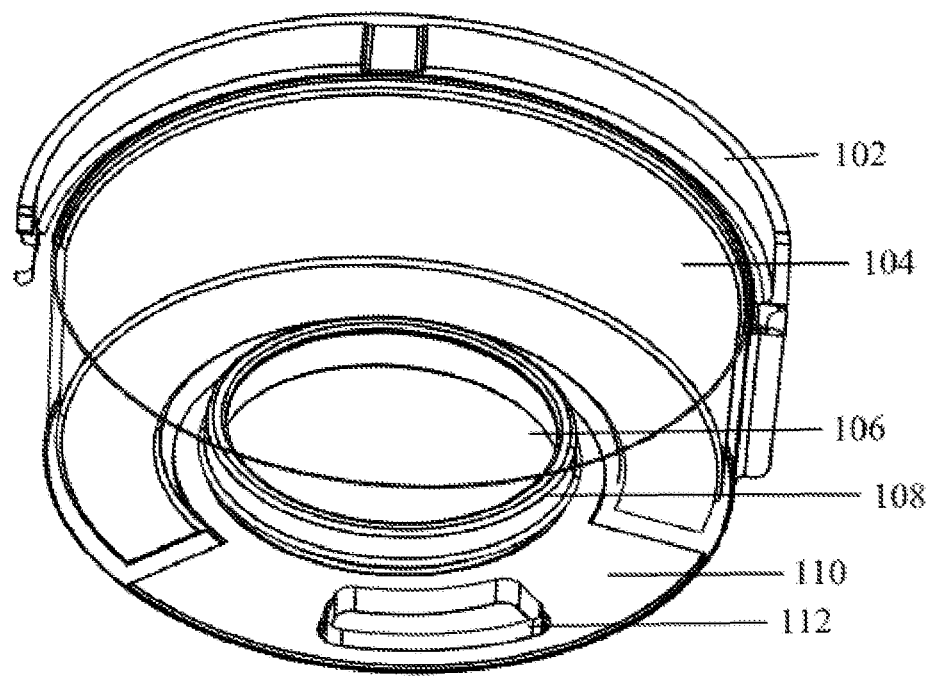
FIG. 1 shows a view of the dry flour container.

FIG. 1 shows a view of the dry flour container 104. The cylindrical dry flour container has two openings. The upper opening 102 receives the dry flour and the lower opening has smaller circular opening 106 to receive the compartmental wheel below and an opening 112 of equal size to a single cube of the multiple cubes present in the compartmental wheel. On the outer lower side 110 the knocker is attached to the dry flour container 104. The lip of the smaller opening 108 provides a secure holding for the compartmental wheel to be attached without leaks. The dry flour container is made up of food grade material and is big enough to hold flour to make 1-20 dough balls. Preferably the dry flour container is transparent so that the user may also visually estimate the level of flour left for replenishment. The dry flour container has a lid to close it from the top. The dry flour container also houses the packer and blade assembly for distribution of flour.

Figure 2:
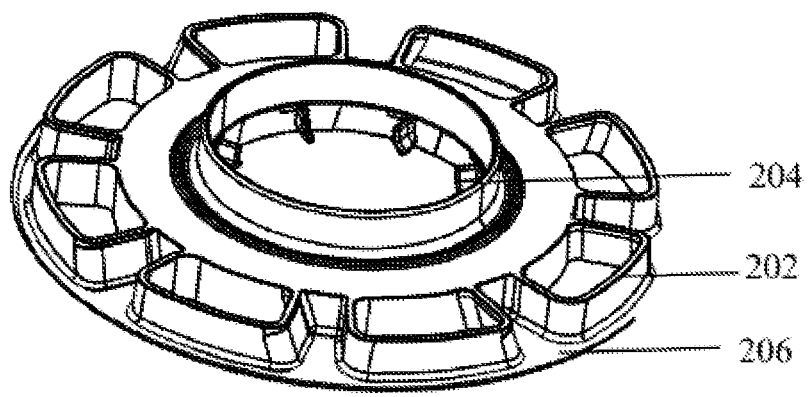
FIG. 2 shows an exploded view of the compartmental wheel with multiple cubes.

FIG. 2 shows the unique and novel design for dispersing small but multiple quantities of dry flour to the kneading mechanism of the flat bread making apparatus. This novel design enables the apparatus to dispense controlled but known quantity of dry flour with accuracy. This design also enables the dry flour distribution to be controlled based on user preference. If the user selects a thicker flat bread in size more flour has to be dispensed to accommodate the preference. However, if the user preference is thinner flat bread then the dry flour will be dispensed using only a limited number of multiple cubes in the compartmental wheel. This novel wheel design also enables the dough making apparatus to estimate the stickiness and correct the optimal viscoelasticity property of the dough ball that is being formed for making a flat bread.

FIG. 2 shows different parts of the compartmental wheel. The inner circular ring 204 that fits into the opening 106. The base of the compartmental wheel 206 accommodates several cubes 202 for the compartmental wheel. Compartmental wheel 202 rotates to dispense fixed amount of powder. This is done by using detection by optical encoder and the activation on counts by the teeth profile on the gearbox that has one tooth for every compartment 202 on compartment wheel 202.

Figure 3:
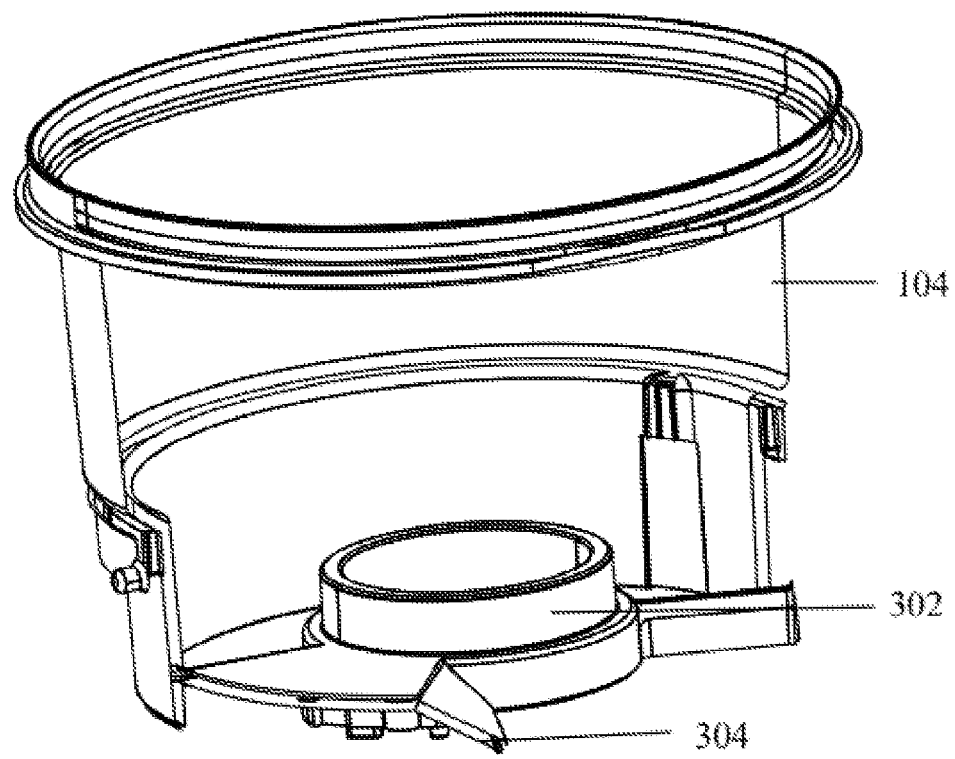
FIG. 3 shows a perspective view of the dry flour container and the knocker attached to it.
Figure 4:
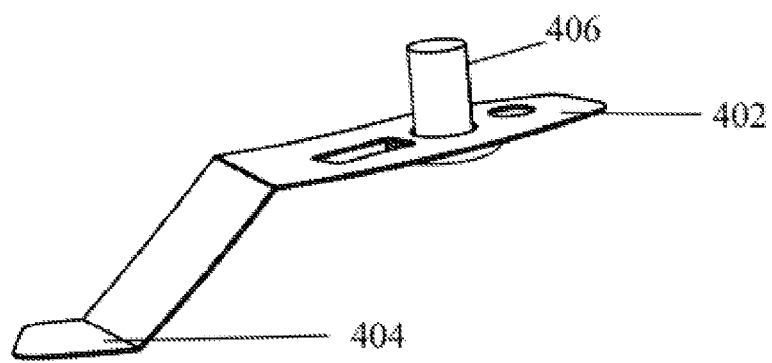
FIG. 4 shows a view of the knocker and its parts.

FIG. 3 shows a cross section of the container 104 having a distinct ring 302 and the knocker attachment portion 304. FIG. 4 shows the knocker 402 that is made up of multiple parts. The stub 406 is used for securing the knocker to the base of the dry flour container 304. The unique spring steel 404 design of the knocker allows the spring steel part 404 to press the dry flour out of the multiple cube 202 in the compartmental wheel. Once the spring steel part 404 has pushed the flour out of the cubes it springs back to original position.

The knocking process is as follows. As compartmental wheel 206 rotates, the wall of cube 202 comes into contact with knocker 402, such that the wall of cube 202 biases knocker 402 into a biased position. Once the wall of cube 202 has navigated pass knocker 402, the biasing force is removed, and knocker 402 springs back to its original unbiased position. With this springing action, knocker 402 knocks the flour of a single cube 202. Knocker 402 ensures that all of the flour in cube 202 is dispensed by this knocking action.

Figure 5:
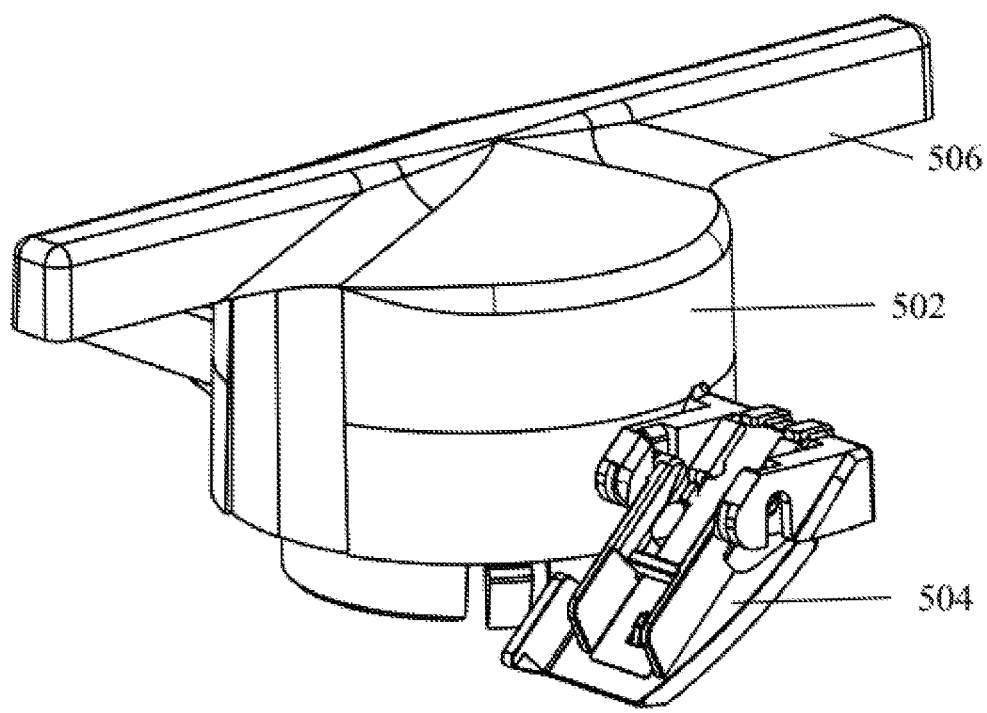
FIG. 5 shows the blade assembly with a packer attached to it.

FIG. 5 shows the blade assembly 502 is adapted to fit into dry flour container 104. Blade assembly 502 comprises of packer 504 and the blade 506. The blade 506 rotates inside the dry flour container and rotates opposite to the compartmental wheel. The invention disclosed herein is essentially a "Packer-Knocker" design. The "Packer" 504 component packs the powdered flour into compartments 202 and the "Knocker" 402 component knocks the powdered flour out of compartments 202. This overcomes the technological challenge of packed flour not being completely dispersed into the kneading compartment and adaptive adjustment is performed to get a dough ball having an optimal viscoelastic property. It also discloses the novel technological advancement of choosing of the thickness of the flat bread and adjusting the dry flour input accordingly.

The "Packer" component will now be described. Referring to FIG. 3, blade assembly 102 is shown. Preferably, packer 103 is made up of spring steel which returns to its original shape once a biasing force is removed. In its original unbiased position, packer 103 is positioned at an inclined angle relative to a horizontal axis of blade assembly 102. Preferably, this angle is around 45 degrees. A sufficient biasing force will move the packer 103 to a biased position. This biased position can be at an angle less than its unbiased position. The removal of the biasing force will cause packer 504 to spring back to its original unbiased position. Preferably, blade assembly 502 comprises a plurality of packers 504. Preferably, the plurality of packers 504 are spaced apart and are located on an opposite end to one another. Now referring to FIG. 5, the blade assembly 502 is shown with packing wheel 105. Motors drive the rotational movement of blade assembly 502 and packing wheel 105. Preferably, blade assembly 502 rotates in the opposite direction to packing wheel 504.

Dry flour container 104 contains powdered flour. The packing process is as follows. As blade assembly 502 rotates, packer 504 is impeded by limb of 506, which applies a biasing force to packer 504. The biasing force causes packer 504 to move to its biased position. Once packer 504 has navigated pass limb 506, the biasing force is removed, and packer 504 springs back to its original unbiased position. With this springing action, packer 504 catches on to some of the powdered flour in dry flour container 104, and propels and packs the powdered flour into cube 202 of compartment wheel 206. Compartment wheel 206 rotates in the opposite direction as compared to blade assembly 502. This is so the packing operation is optimized. The rotational movement of compartment wheel 206 is also synchronized to that of blade assembly 502 such that when packer 504 is springing back to its original unbiased position, a single compartment 202 is already in the optimal position to receive the flour being propelled by packer 504.

Figure 6:
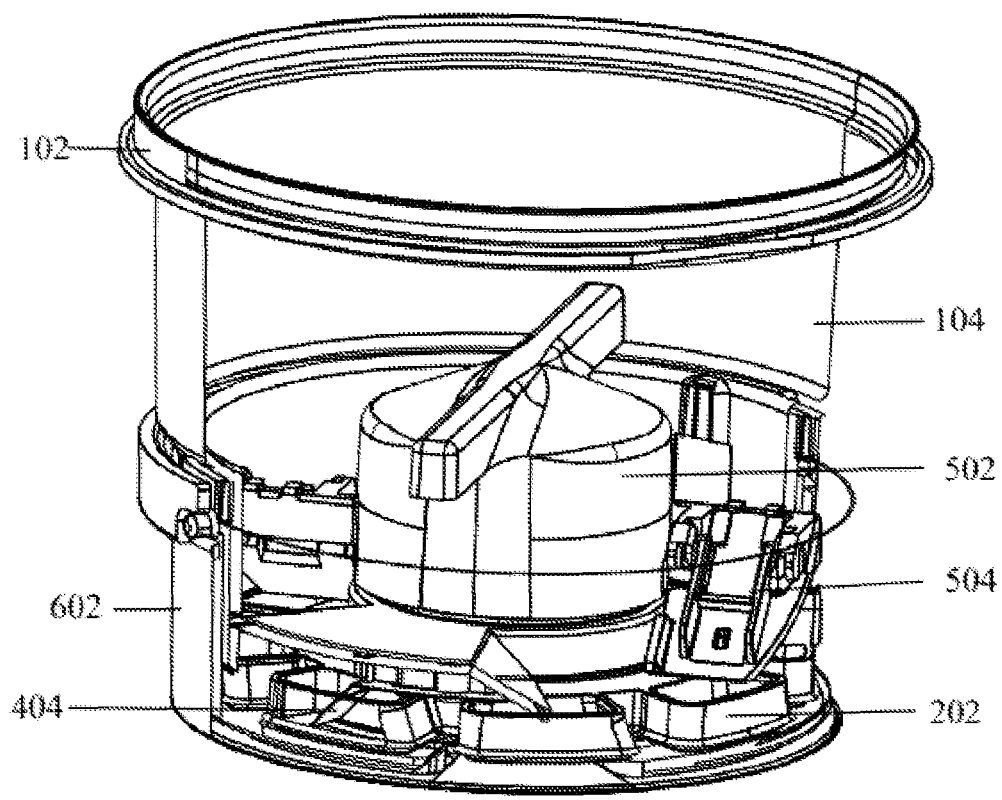
FIG. 6 shows the dry flour dispensing apparatus with various parts assembled.

FIG. 6 shows a consolidated view of the container 104 housing blade assembly 502, packer 504, knocker 404, individual cube 202 of the compartmental wheel and an outer layer 602 to encase all these components. This whole assembly sits on a gear box attached to a motor.

Figure 7A:
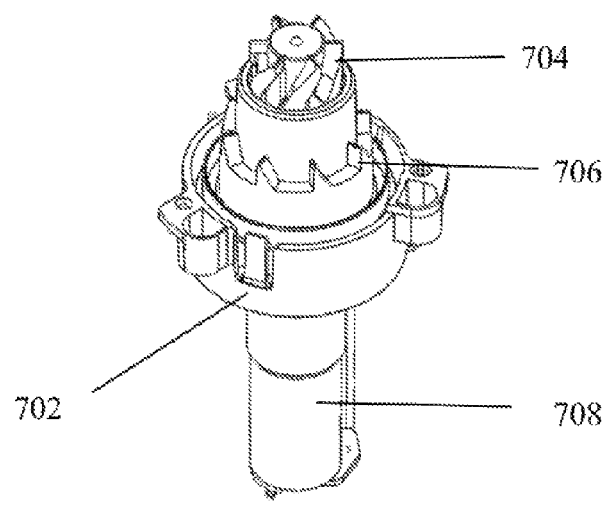
FIG. 7a shows a perspective view of the gear box attached to the motor.
Figure 7B:
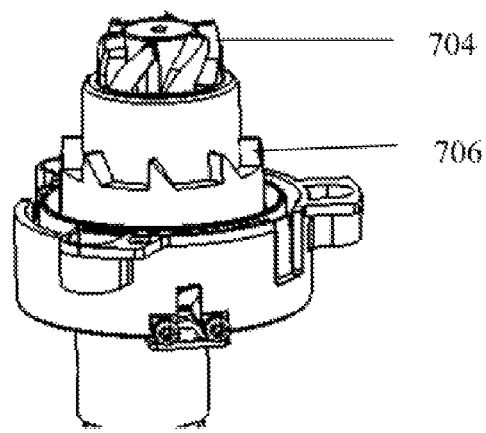
FIG. 7b shows a side view of the gear box and its teeth that correspond to the multiple cubes in the compartmental wheel.

FIG. 7A shows the gear box 702. The tooth 704 is for rotational purposes. However, the teeth 706 are designed such that it corresponds to the cube 202 and helps fill each cube 202 one at a time. The shaft 708 is attached to the motor. FIG. 7B shows a closer look of the gear box 702 with enlarged tooth 704 and teeth that relate to the cube 706.

Figure 8:
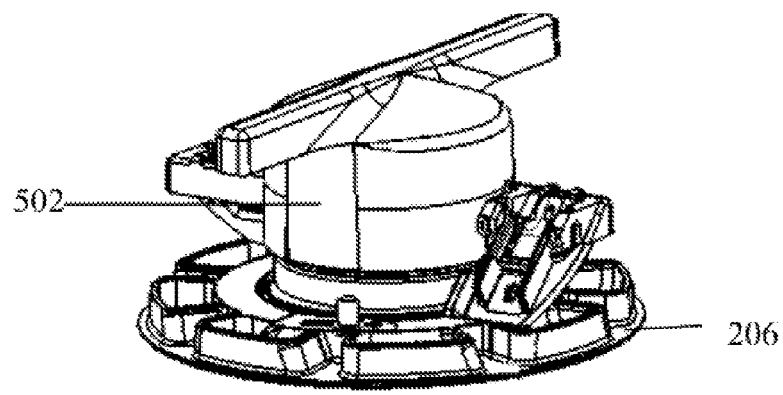
FIG. 8 shows the blade attached to the compartmental wheel with multiple cubes.

FIG. 8 shows the assembly of blade assembly 502 and the compartmental wheel 206 and the alignment of the packer with respect to the cube 206.

Figure 9A:
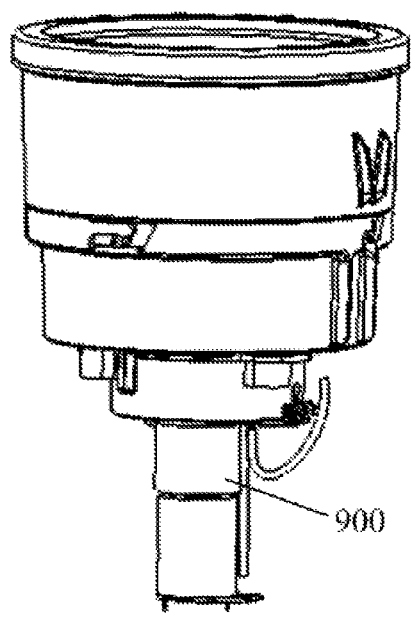
FIG. 9A shows the side view of the flour dispensing apparatus.
Figure 9B:
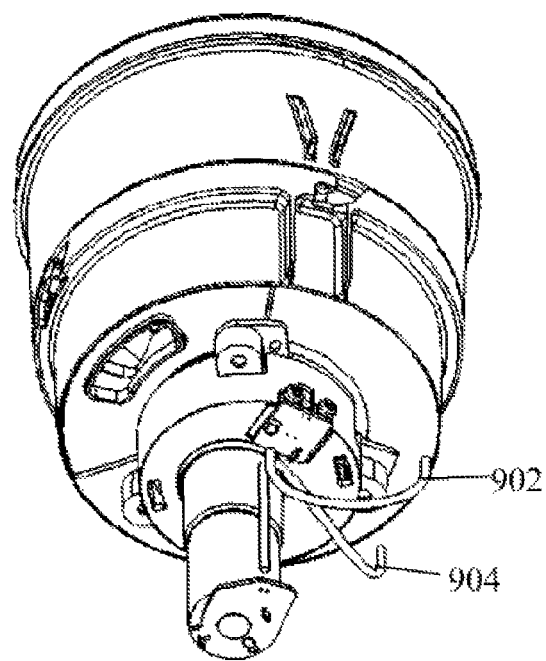
FIG. 9B shows the bottom view of the flour dispensing apparatus.

FIG. 9A shows the outer side view of the whole flour dispensing apparatus 900. FIG. 9B shows the bottom view of the flour dispensing apparatus with tubes for dispensing water 902 and oil 904, in one perspective.

In one embodiment, a method of dispensing dry flour is described. The method starts with filling a dry flour container with dry flour for a specific quantity to make a flat bread. A blade rotates through the dry flour to disturb the dry flour and move the dry flour to a dispenser. A specified quantity of the dry flour is dispensed and received from the dispenser using a packer into a compartmental wheel having a multiple flour holder; and dispersing the filled dry flour from each multiple flour holder to a kneading compartment is done using a knocker.

In another embodiment, monitoring the level of dry flour in the container using feedback from a current drawn by a motor and the current drawn by the motor is correlated with the level of dry flour in the container using software residing in the processor. In another embodiment, the dry flour is tapped to by a knocker to empty from the multiple flour holders into the kneading container. The current drawn by a flour dispenser motor is directly proportional to the amount of flour in compartment 202. This allows the software to detect if compartment 106 is empty. The technical challenge that has been overcome there with this technology is that partial dispersement of the flour can be done based on the feedback received from downstream methods such as kneading, mixing or any other food processing apparatus. The apparatus may be a part of a food processing apparatus that is being used for making flat bread and requires no human intervention.

Although the present embodiments have been described with reference to specific example embodiments, it will be evident that various modifications and changes may be made to these embodiments without departing from the broader sprit and scope of the various embodiments. Accordingly, the specification and drawings are to be regarded in an illustrative rather than a restrictive sense.

What is claimed is:

1. A dry flour dispensing apparatus to make a single dough ball at a time, comprising:
    a dry flour container, for holding a dry flour, having a upper opening to receive the dry flour for making a flat bread, a lower opening having a circular opening to receive a compartmental wheel and an opening equal to a specific quantity the dry flour in the compartmental wheel to dispense a specific volumetric quantity of the dry flour;
    a blade assembly having a horizontal arm as a blade that rotates in an opposite direction of the compartmental wheel and a packer, wherein the horizontal arm is housed within the dry flour container and fitted to the circular opening of the dry flour container to rotate through the dry flour in one direction and disturb the dry flour;
    the packer is made of spring steel and is attached to the horizontal arm of the blade assembly and is situated at an angle that is biased and rotates in the same direction as the compartmental wheel for packing the dry flour into the compartmental wheel one at a time for multiple flour holders so that a specific amount is filled for each dispersement;
    the compartmental wheel attached to the outer bottom surface of the circular opening of the dry flour container having a multiple flour holders as to hold the specific volumetric quantity of dry flour for each dispersement based on a user preference of thick or thin size of the flat bread and to adjust an optimal viscoelasticity property of the single dough ball;
    a knocker to knock the dry flour out of the to a kneading apparatus so that the entire amount of the dry flour that was packed by the packer is dispersed completely; and
    a gear box to rotate the blade assembly, the packer and the compartmental wheel to dispense the specific amount of dry flour to each of the compartmental wheel sections, wherein upon rotation of the horizontal bar attached to the blade assembly moves the flour in the container, the packer propels a specific amount of flour into one compartment through the side opening, and the knocker empties the the compartmental wheel transferring the flour into a kneading apparatus.

2. The apparatus of claim 1, further comprising:
    an optical encoder to activate the gear box count using the a teeth profile of the gear box.

3. The apparatus of claim 2, wherein each gear box count using the teeth profile fills each multiple flour holder.

4. The apparatus of claim 1, wherein the packer is made up of a spring steel.

5. The apparatus of claim 1, wherein the knocker is made up of a spring steel.

6. The apparatus of claim 1, further comprising:
    a motor to draw a current to directly correlate a drawn current to a level of dry flour present in the dry flour container; and
    a software residing in a processor controls the motor and records the correlation of the drawn current by the motor and determines the level of dry flour in the dry flour container.

7. The dispensing apparatus of claim 1, wherein during flour distribution the the compartmental wheel receiving the flour is aligned with the packer and the side opening.

8. The dispensing apparatus of claim 1, wherein a filled up the compartmental wheel moves allowing positioning in alignment with the packer and the side opening.

9. The dispensing apparatus of claim 1, wherein a filled up with the dry flour the compartmental wheel moves such as to be contacted by the knocker for being emptied.

10. The dispensing apparatus of claim 1, wherein the blade assembly and the compartmental wheel rotate in opposite directions.

11. The dispensing apparatus of claim 1, wherein attachment of each packer to the blade assembly is effected by springs configured to cause the packer to move between a biasing position and an unbiased position.

12. The dispensing apparatus of claim 1, wherein the knocker comprises a spring steel part which presses the flour out of the compartment.

13. The dispensing apparatus of claim 1, wherein the gear box is attached to a motor, and wherein the motor is configured to draw a current which correlates with the level of flour in the container.

14. The dispensing apparatus of claim 1, wherein the gear box comprises a tooth system which corresponds to the plurality of compartments.

15. The dispensing apparatus of claim 1, wherein the gear box embodies an optical encoder, a microprocessor and a software allowing control of the tooth system, the specific amount of flour to be dispensed in the compartment, the level of flour in the container.

16. The dispensing apparatus of claim 1, further comprising a lid to close an upper opening of the container.

* * * * *